United States Patent [19]

Mucheyer et al.

[11] Patent Number: 4,463,660
[45] Date of Patent: Aug. 7, 1984

[54] MULTI-WAY VALVE

[75] Inventors: Norbert Mucheyer, Rechtenbach; Heinz Schulte, Marktheidenfeld, both of Fed. Rep. of Germany

[73] Assignee: Mannesmann Rexroth GmbH, Lohr, Fed. Rep. of Germany

[21] Appl. No.: 372,848

[22] Filed: Apr. 29, 1982

[30] Foreign Application Priority Data

May 14, 1981 [DE] Fed. Rep. of Germany ....... 3119101

[51] Int. Cl.$^3$ .............................................. F15B 13/042
[52] U.S. Cl. ........................................ 91/469; 91/388; 91/447; 91/451; 137/596.13; 137/625.3; 137/625.69
[58] Field of Search ................. 91/388, 447, 451, 469; 137/596.13, 596.14, 625.3, 625.66, 625.68, 625.69

[56] References Cited

U.S. PATENT DOCUMENTS

| | | | |
|---|---|---|---|
| 3,488,953 | 1/1970 | Haussler | 137/596.13 |
| 4,040,438 | 8/1977 | Wilke | 137/596.13 X |
| 4,051,868 | 10/1977 | Andersen | 137/596.13 |
| 4,242,942 | 1/1981 | Bartholomaus et al. | 137/625.67 X |
| 4,313,467 | 2/1982 | Lang | 137/625.3 |

Primary Examiner—Gerald A. Michalsky
Attorney, Agent, or Firm—Roylance, Abrams, Berdo & Goodman

[57] ABSTRACT

A multi-way valve for precisely controlling supplying pressure to a load device, comprising a housing and a control slide slidably mounted in the housing. The housing has annular, internal passages axially spaced along the length of the housing, with first and fifth passages located on opposite sides of second, third and fourth passages in fluid communication with a supply tank, the load device and a fluid pressure source, respectively. The control slide is slidably mounted in the passages and has parts axially spaced along the slide and axially separated by annular grooves, and an internal, longitudinal passages. First and second springs are coupled to opposite ends of the slide and bias the slide to a middle, rest position. First and second control chambers are located in the housing adjacent the slide opposite ends for applying varying pressures to the slide opposite ends. One of the annular grooves on the shaft controls connections of the load device with the supply tank and fluid pressure source and has restricting means for reducing the tendency of the slide to reciprocate.

2 Claims, 3 Drawing Figures

MULTI-WAY VALVE

The invention relates to a multi-way valve for precisely controlling the supply of fluid pressure to a load device.

BACKGROUND OF THE INVENTION

In a conventional hydraulic multi-way valve for a servomechanism, a piston part of a valve distributing slide closes an annular passage connected with a pressure source. This passage can be connected by operation of the servo-piston slide with one of two load device connections. The other load device connection is connected with a supply tank. These connections can be reversed. The leading edges of the piston part controlling the connections of the two load device connections with the connections of the pressure source and the supply tank are provided with control notches, through which no pressure agent flows when the servo-piston slide is in its rest position (see, for example, Dieter, "Olhydraulikfibel", Krausskopf-Verlag, Weisbaden 1960, p. 176).

BRIEF DESCRIPTION OF THE INVENTION

An object of the present invention is to provide a precisely controllable proportional valve for an automatic control system, which valve connects or separates control lines between the automatic control system and a fluid pressure source.

Another object of the present invention is to provide a system for precisely controlling the fluid pressure supplied to a load device.

Other objects, advantages and salient features of the present invention will become apparent from the following detailed description of a preferred embodiment of the invention.

Briefly described, the invention includes an improved multi-way valve for precisely controlling supplying pressure to a load device, comprising a housing and a control slide slidably mounted in the housing. The housing has first, second, third, fourth and fifth annular, internal passages axially spaced along the length of the housing, with the first and fifth passages located on opposite sides of the second, third and fourth passages which are in fluid communication with a supply tank, the load device and a fluid pressure source, respectively. The control slide is slidably mounted in the passages and has first, second, third and fourth piston parts axially spaced along the slide and axially separated by annular grooves. The slide also has an internal, longitudinal passage. First and second springs are coupled to opposite ends of the slide and bias the slide to a middle, rest position. First and second control chambers are located in the housing adjacent the slide opposite ends for applying varying pressures to the slide opposite ends. One of the annular grooves on the shaft controls connection of the load device with the supply tank and fluid pressure source and has restricting means for reducing the tendency of the slide to reciprocate.

In operation, the first and fifth passages are in fluid communication with the supply tank with the slide in its rest position. The first passage is separated from the supply tank after a predetermined first movement of the slide in one direction, and the load device is coupled in fluid communication with the supply tank after a predetermined second movement of the slide in that one direction. The fifth passage is separated from the supply tank after a predetermined first movement of the slide in an opposite direction, and the load device is coupled in fluid communication with the fluid pressure source after a second movement of said slide in that opposite direction.

The multi-way valve according to the invention is precisely controllable by means of its restricting parts and is engaged in a controlling position in the automatic control system.

The restricting means can be located on opposite sides of the annular groove between the second and third piston parts and can comprise annular collars and recesses with diameters greater than the diameter of such annular groove. The collars and recesses can be calibrated such that the multi-way valve can be adapted to the conditions in the automatic control system.

The annular collars can have uniformly distributed cutouts on its periphery opening in a radially outward direction and extending radially inwardly to approximately the diameter of the annular groove between the second and third piston parts. These cutouts provide improved restricting capacity for the restricting parts.

BRIEF DESCRIPTION OF THE DRAWINGS

In order that the manner in which the foregoing and other objects are attained in accordance with the invention can be understood in detail, a particularly advantageous embodiment thereof for controlling a hoisting gear train of a tractor will be described with reference to the accompanying drawings, which form a part of this specification, and wherein.

DETAILED DESCRIPTION OF THE PREFERRED EMBODIMENT OF THE INVENTION

Figure 1:
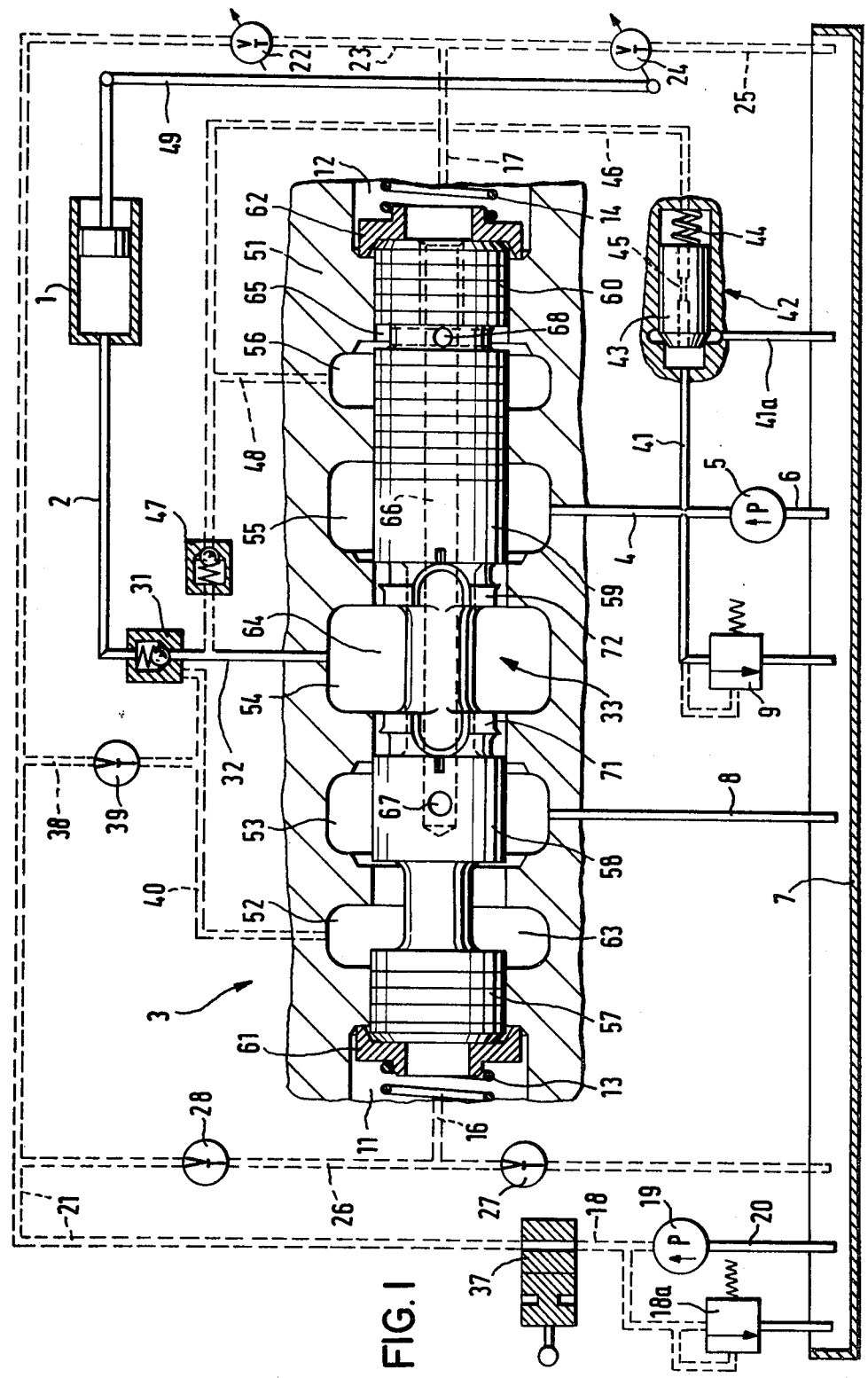
FIG. 1 is a schematic view of a control system in accordance with the present invention with the multi-way valve partially illustrated in longitudinal section.

A correcting element 1 comprising a piston and cylinder is connected to the servomechanism through a servo-controllable check valve 31. Valve 31 can open automatically by fluid flow in the direction toward correcting element 1, and can be held open to permit fluid flow in a direction away from correcting element 1. A line 32 couples valve 31 with a five port, three way multi-way valve 3 which is operable in both directions by fluid pressure. A pump 5 is connected to multi-way valve 3 through line 4. The intake line 6 of pump 5 is coupled to supply tank 7. A pressure relief valve 9 is connected to line 4, and its drain port is connected with tank 7.

Multi-way valve 3 has a housing 51 and a control slide slidably mounted within the housing. Control chambers 11, 12 are arranged adjacent opposite ends of slide 33 for operation of slide 33. The admission of a pressure agent (liquid or gas) in chamber 11 or 12 moves slide 33 against the bias of one of the control springs 13, 14. Control springs 13, 14 with the same pressure in control chambers 11, 12 hold slide 33 in its middle or rest position. A control line 16 is connected to control chamber 11 and a control line 17 is connected to control chamber 12 for supplying and relieving pressure from the control chambers.

A control line 18 is connected to the pressure side of a control pump 19. The pump intake line 20 is connected with tank 7. A pressure relief valve 18a is connected to control line 18. Control line 18 is connected through a two port, two-way valve 37 which is manually operated to regulate fluid flow in a control line 21, which leads to an adjustable restrictor 22. From restrictor 22, a control line 23 leads to an adjustable restrictor 24, which is connected through a line 25 with tank 7. Control line 23 is connected with control line 17 leading to control chamber 12. Two restrictors 27 and 28 are connected with control line 16 through a control line 26. The side of restrictor 27 opposite restrictor 28 is connected to tank 7, while the side of restrictor 28 opposite restrictor 27 is connected to control line 21.

A control line 38 is connected with control line 21, and a restrictor 39 is provided in line 38. The side of restrictor 39 opposite control line 21 is connected through line 40 with the control side of check valve 31 and with multi-way valve 3.

A pressure compensator 42 is connected to line 4 through line 41, is connected with tank 7 through a line 41a, and is opened by a differential pressure of approximately 5 bar. Piston manometer 42 has a movable valve member 43 biased by a spring 44 toward its closed position, in which the connection between lines 41 and 41a is closed. The valve member is provided with a restrictor 45, which is connected with a control line 46. Control line 46 is connected with this line through a check valve 47 which can open for flow toward line 32. A control line 48 is branched to the multi-way valve 3. The movable part of correcting element 1 is mechanically connected by means of a mechanical connection element 49 with the correcting element of adjustable restrictor 24.

Slide 33 of valve 3 is axially movable in a longitudinal bore in housing 51. Housing 51 has five annular passages 52 to 56, as viewed from left to right in FIG. 1, with annular passage 52 connected to control line 16, annular passage 53 connected to tank 7 through line 8, annular passage 54 coupled to correcting element 1 through line 32, annular passage 55 connected to pump 5 through line 4 and annular passage 56 coupled to control line 48.

Slide 33 has four piston parts 57 to 60 of different widths. Piston part 57, on its left side as viewed in FIG. 1, is in fluid communication with control chamber 11. A spring plate 61 having a hole in its middle is located in chamber 11 and is biased by spring 13 against a shoulder of housing 51 when slide 33 is in its middle position. A spring plate 62 is provided on the other end of slide 33 where it is biased by spring 14 against a shoulder in chamber 12 of housing 51 when slide 33 is in its middle position. When slide 33 is in its middle position illustrated in FIG. 1, its longitudinal ends engage spring plates 61 and 62. Movement of slide 33 to the left compresses spring 13, while movement to the right compresses spring 14.

Annular grooves 63 to 65 of different widths are provided between piston parts 57 to 60. An internal axial passage 66 in slide 33 extends approximately from the middle of piston part 58 to annular groove 65 and is closed on its end adjacent piston part 60. A radial bore 67 in piston part 58 connects longitudinal passage 66 with annular passage 53 when slide 33 is in its rest position and a radial bore 68 connects passage 66 with annular groove 65.

Piston part 57 closes annular passage 52 from control chamber 11. In the illustrated rest position of slide 33, annular passage 52 is connected through a narrow clearance between piston part 58 and housing 51 with annular passage 53, and thus, with supply tank 7. Through a clearance of the same width between piston part 59 and housing 51, annular passage 56 is connected with annular groove 65, and then through radial bore 68, passage 66 and radial bore 67 to annular passage 53 for connecting passage 56 with tank 7. When slide 33 is in its rest position, annular passage 54 is separated from annular passage 53 by piston part 58 and from annular passage 55 by piston part 59. The housing barely contacts the sections of piston parts 58 and 59 facing annular passage 54. The contact areas between the piston parts and housing and the spacing between the piston parts and housing annular passages are selected such that annular passage 54 is not connected to annular passage 53 or annular passage 55 until the connection between annular passage 52 and annular passage 53 or between annular passage 56 and annular groove 65 is interrupted.

Figure 2:
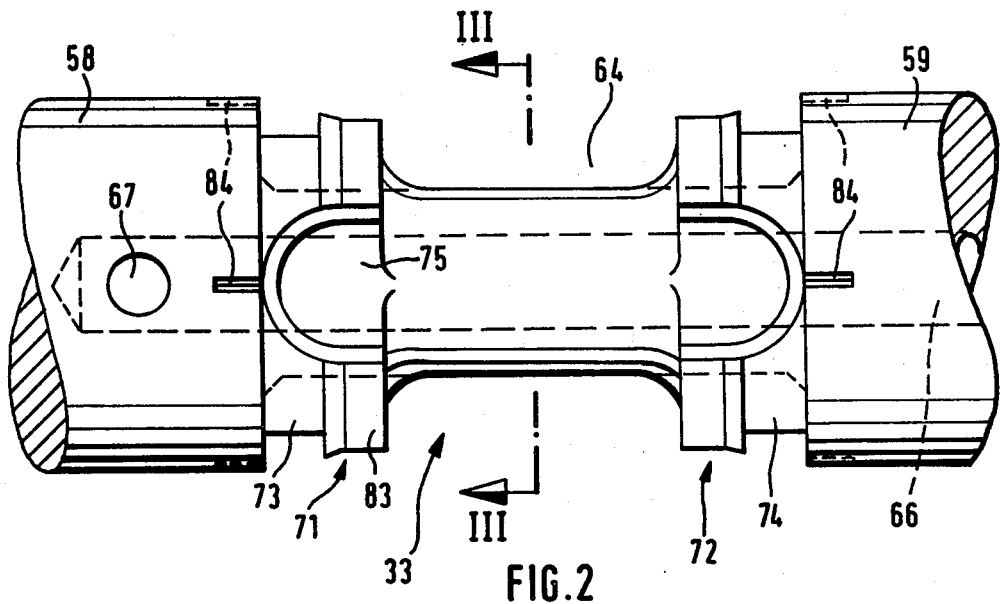
FIG. 2 is an enlarged, partial side elevational view illustrating the control slide of the multi-way valve of FIG. 1.
Figure 3:
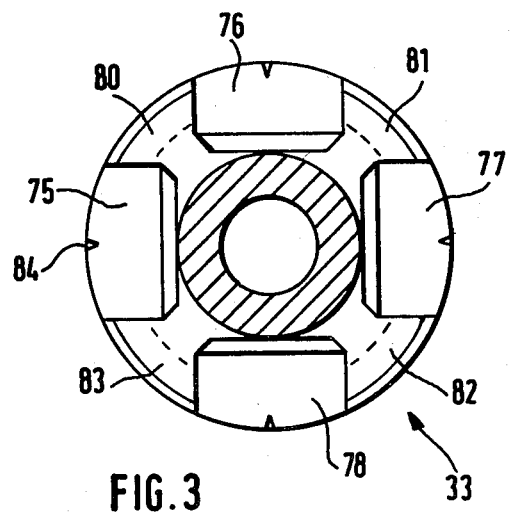
FIG. 3 is a front elevational view in section of the control slide taken along lines III—III of FIG. 2.

As illustrated in FIGS. 2 and 3, adjacent both longitudinal ends of groove 64, slide 33 has collars 71 and 72 followed by annular recesses 73 and 74 adjacent piston parts 58 and 59. The width and/or diameter of the recesses are selected corresponding to the relevant conditions in valve 3.

Four inwardly extending cutouts 75 to 78 are uniformly distributed on the periphery of each of the annular collars 71, 72 and the base of each annular recesses 73, 74. Cutouts 75 to 78 are milled radially inwardly by means of a milling attachment. The cutouts extend radially inwardly to the base of annular groove 64, open in a radially outward direction and, as seen in FIG. 2, have semi-cylindrical surfaces facing the middle of annular groove 64. The semi-cylindrical surfaces end on the sides of the recesses and have parallel walls extending therefrom in the area of the annular collars. Four winglike restricting parts 80 to 83 project on each of the annular collars 71, 72. The precise control of slide 33 is achieved by means of the restricting wing-like parts 80 to 83 by reducing the reciprocation of slide 33 caused by the pressure agent flowing through annular groove 64. By selection of suitable dimensions for annular collars 71, 72, recesses 73, 74 and restricting parts 80 to 83, multi-way valve 3 can be adapted to a particular automatic control system or can be caused to cooperate with the system. Wedge-shaped control grooves 84 are provided on the sections of piston parts 58 and 59 adjacent cutouts 75 to 78 with the dimensions thereof dependent on the requirements of multi-way valve 3.

The restrictor 22 provides a setting mechanism for the system. Restrictor 24 is mechanically connected by means of the connection element 49 with the movable part of correcting element 1. Both restrictors 27, 28 can be set throttles for only reducing the control pressure, or can be adjustable throttles for adjusting the control cycle, particularly for the purpose of justification.

In the rest position of slide 33 shown in FIG. 1, control lines 40 and 46 are in fluid communication with tank 7, and the pump 5 conveys its initial pressure, at a maximum of 5 bar, through pressure compensator 42 into tank 7. Correcting element 1 is held in position by the closed check valve 31. Annular passages 53 to 55 are connected with each other through control grooves 84, and annular passages 52 and 56 are connected with annular passage 53 through a set clearance and through longitudinal passage 66, respectively.

If setting of restrictor 22 is changed, then the pressure in control lines 16 and/or 17 is changed. After a first predetermined movement of slide 33 to the right as viewed in FIG. 1, the annular passage 56 is separated from tank 7 and pressure agent flows through control line 46 and check valve 47 into line 32, whereupon pressure is fed to pressure compensator 42. After a second predetermined sliding movement of slide 33 to the right, piston part 59 frees the connection between annular passages 54 and 55, and the connection between annular passages 53 and 54 through the control grooves 84 is interrupted. Pump 5 is thereby connected directly with line 32 and correcting element 1 moves more or less rapidly across the opened clearance. Due to the connection of control line 46 with line 32, the pressure of the pump is limited to the pressure existing in correcting element 1. As long as only a small pressure differential exists between the two control chambers 11 and 12 and the connection between annular passages 55 and 54 is blocked by piston part 59, pressure agent is conveyed through control line 48 and through control grooves 84 to correcting element 1 dependent only upon the size of restrictor 45. Pressure compensator 42, restrictor 45, check valve 47 and multi-way valve 3 work together as a 3-way-flow control valve.

If slide 33 is moved to the left as seen in FIG. 1, then after a first predetermined sliding movement of slide 33, control line 40 is separated from supply tank 7 by piston part 58 and annular grooves 54 and 55 remain in fluid communication through control grooves 84. After a second predetermined movement of slide 33 to the left, line 32 is connected with tank 7 through passages 53 and 54, and the connection between annular passages 54 and 55 is interrupted by piston part 59. Check valve 31 is forced open by pressure arising in control line 40 such that pressure agent can flow out of correcting element 1 into tank 7.

As long as only a small pressure differential exists between the two control chambers 11 and 12 and the connection between annular passages 54 and 53 is blocked by piston part 58 and the connection of annular passages 54 and 55 is blocked by piston part 59 and additionally, check valve 31 is open then pressure agent flows out of correcting element 1 through control grooves 84 in piston part 58 from annular passage 54 into annular passage 53 and into the tank. Pressure agent also flows through control grooves 84 in piston part 59 from annular passage 54 to annular passage 55 and to pressure compensator 42. Pressure compensator 42 is open to supply tank 7 as a result of the pressure produced by pump 5. Thus, the smallest possible velocity of the correcting element 1 depends upon the cross section of control grooves 84. As long as annular passage 52 or 56 is connected with tank 7, correcting element 1 does not move.

In this manner the pressure supplied to cylinder 1 can be precisely controlled by adjusting restrictor 22.

While a certain advantageous embodiment has been chosen to illustrate the invention it will be understood by those skilled in the art that various changes and modifications can be made therein without departing from the scope of the invention as defined in the appended claims.

What is claimed is:

1. A multi-way valve for precisely controlling supplying pressure to a load device, comprising:
   a housing having first, second and third annular, internal passages axially spaced along the length of said housing, with said first, second and third passages in fluid communication with a supply tank, the load device and a fluid pressure source, respectively;
   a control slide slidably mounted in said housing within said passages, said slide having first and second piston parts axially spaced along said slide and axially separated by an annular groove, said piston parts of said slide controlling connections of the load device with the supply tank and fluid pressure source; and
   restricting means for reducing the tendency of said slide to reciprocate, said restricting means being located on opposite sides of said annular groove and on ends of said first and second piston parts and including annular collars and annular recesses with diameters greater than the diameter of said annular groove, each said annular collar having uniformly distributed cutouts on the periphery thereof, said cutouts opening and widening in a radially outward direction and extending radially inwardly to approximately the diameter of said annular groove, said cutouts extending to bases of said recesses and defining wing-like parts therebetween which extend radially outwardly to approximately the same diameter of said piston parts.

2. A multi-way valve according to claim 1 wherein said first passage is in fluid communication with the load device with said slide in a rest position, and is in fluid communication through control grooves in said piston parts and through said first and third passages with the fluid pressure source and the supply tank.

* * * * *